United States Patent

Zeyer

[11] Patent Number: 5,962,816
[45] Date of Patent: Oct. 5, 1999

[54] COMBINATORIAL WEIGHING APPARATUS

[75] Inventor: Bernd Zeyer, Engelsberg, Germany

[73] Assignee: Multipond Wagetechnik GmbH, Waldkraiburg, Germany

[21] Appl. No.: 08/981,366

[22] PCT Filed: Apr. 29, 1997

[86] PCT No.: PCT/EP97/02204

§ 371 Date: Dec. 19, 1997

§ 102(e) Date: Dec. 19, 1997

[87] PCT Pub. No.: WO97/42471

PCT Pub. Date: Nov. 13, 1997

[30] Foreign Application Priority Data

May 6, 1996 [DE] Germany ............... 196 17 982

[51] Int. Cl.[6] ............................................. G01G 13/00
[52] U.S. Cl. .................................................. 177/25.18
[58] Field of Search ........................ 177/25.18, 103, 177/104, 145

[56] References Cited

U.S. PATENT DOCUMENTS

| | | | |
|---|---|---|---|
| 4,491,189 | 1/1985 | Fukuda ................... | 177/25.18 |
| 4,511,009 | 4/1985 | Kataoka .................. | 177/25.18 |
| 4,538,693 | 9/1985 | Klopfenstein et al. ..... | 177/25.18 |
| 4,901,807 | 2/1990 | Muskat et al. .......... | 177/25.18 |
| 5,191,947 | 3/1993 | Peterson ................ | 177/25.18 |
| 5,340,949 | 8/1994 | Fujimura et al. ....... | 177/25.18 |
| 5,760,343 | 6/1998 | Arimoto et al. ........ | 177/25.18 |

FOREIGN PATENT DOCUMENTS

| | | |
|---|---|---|
| 0 105 756 A1 | 4/1984 | European Pat. Off. . |
| 0 326 636 A1 | 8/1989 | European Pat. Off. . |
| 0 502 201 A1 | 9/1992 | European Pat. Off. . |
| 0 559 923 A1 | 9/1993 | European Pat. Off. . |
| 0 677 460 A2 | 10/1995 | European Pat. Off. . |
| 84 37 028.9 U1 | 5/1985 | Germany . |
| 37 16 979 A1 | 11/1987 | Germany . |
| 36 36 923 A1 | 5/1988 | Germany . |
| WO 96/07083 | 3/1996 | WIPO . |

Primary Examiner—Randy W. Gibson
Attorney, Agent, or Firm—Dike, Bronstein, Roberts & Cushman, LLP; George W. Neuner

[57] ABSTRACT

A combinatorial weighing apparatus is provided with a distributing device (1) for distributing products to be supplied and a plurality of weighing receptacles (4) arranged substantially in a plane around the distributing device, a plurality of feeding devices (2, 3) for feeding the products from the distributing device (1) to a corresponding one of the weighing receptacles (4) and an apparatus which is arranged below the weighing receptacles (4) and comprises a central discharge opening (7). The apparatus is formed as a conveying apparatus having a conveying member (5, 6) and a drive member, the conveying member (5, 6) being disposed below the weighing receptacles (4) substantially parallel to the first plane and drivable by the drive member in such a manner that the products dropped from the weighing receptacles (4) are transported to the discharge opening (7). The combinatorial weighing apparatus can process delicate weighing goods without damaging the same.

13 Claims, 4 Drawing Sheets ured to the preamble of claim 1.

COMBINATORIAL WEIGHING APPARATUS

The invention relates to a combinatorial weighing apparatus according to the preamble of claim 1.

A combinatorial weighing apparatus of this kind is known from document EP 0 677 460 A2 and used (FIG. 4) for automatically producing equal amounts of product (weight portions). This combinatorial weighing apparatus operates according to the combination principle. The weight portion is combined by several suitable partial combinations. A sufficient number of combinations requires a sufficient number of weighing systems. The weighing systems comprising the weighing receptacles 104 are arranged in a circle around a central distributing device 101. The product is supplied in the center to the central distributing device 101 from above and transported therefrom radially outwardly into supply containers 103 through vibrating channels 102 in timed transport intervals, wherefrom it is discharged into the weighing receptacles 104 therebelow. The partial portions are weighed there at and available for combining a total portion. Finally the partial portions selected for a total portion are brought together in a collection hopper 105 to a common transfer point, the discharge aperture 107 at the lower end of the collection hopper, which opens for example into the filling tube of a packaging machine 106.

A problem exists with delicate lumpy products of fragile consistence and/or sensitive surface condition, such as cakes and pastries with or without a chocolate coating or the like, that in the described portioning process the products dropping in a free fall or sliding over the long inclined wall of the collection hopper are several times accelerated and boltly stopped and may be broken or damaged thereby.

The preamble of claim 1 is known from document EP 0 326 636 A1.

Document DE 37 16 979 A1discloses a combinatorial weighing apparatus wherein the weighing receptacles are arranged one behind the other in a line. A respective feed pan is disposed above each weighing receptacle. Below the weighing receptacles there is a belt conveyor which collects the products discharged from the weighing receptacles and transports the same to a packaging station.

It is the object of the invention to provide a combinatorial weighing apparatus which is able to process sensitive weighing goods without damaging the same.

This object is achieved by the combinatorial weighing apparatus defined in claim 1.

In the inventive combinatorial weighing apparatus the number of drops is reduced by omitting the supply containers. Furthermore, the long sliding movements in the collection hopper are avoided by using the conveyor device which replaces the conventional collection hopper. This also achieves a small overall height of the combinatorial weighing apparatus.

Further developments of the invention are defined in the subclaims.

In the combinatorial weighing apparatus according to claim 8 the unavoidable transfer point from the vibrating channel to the weighing receptacle is more gentle to the products because of a short sliding path in place of the conventional drop.

The following embodiments will be described with reference to the Figures. In the Figures.

Figure 1:
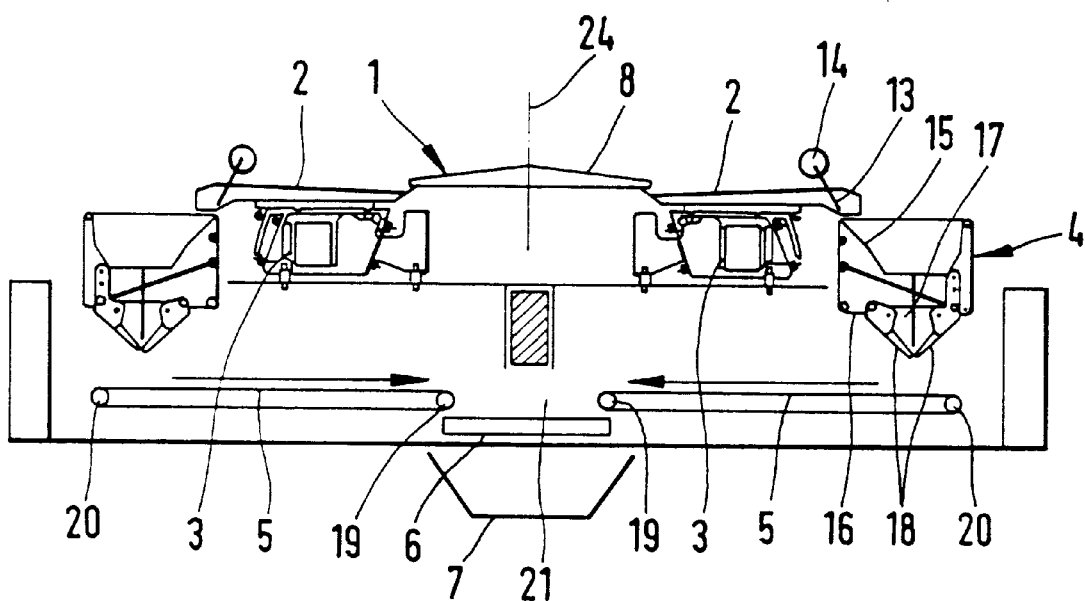
FIG. 1 shows a cross-sectional view of a first embodiment of the inventive combinatorial weighing apparatus.
Figure 2:
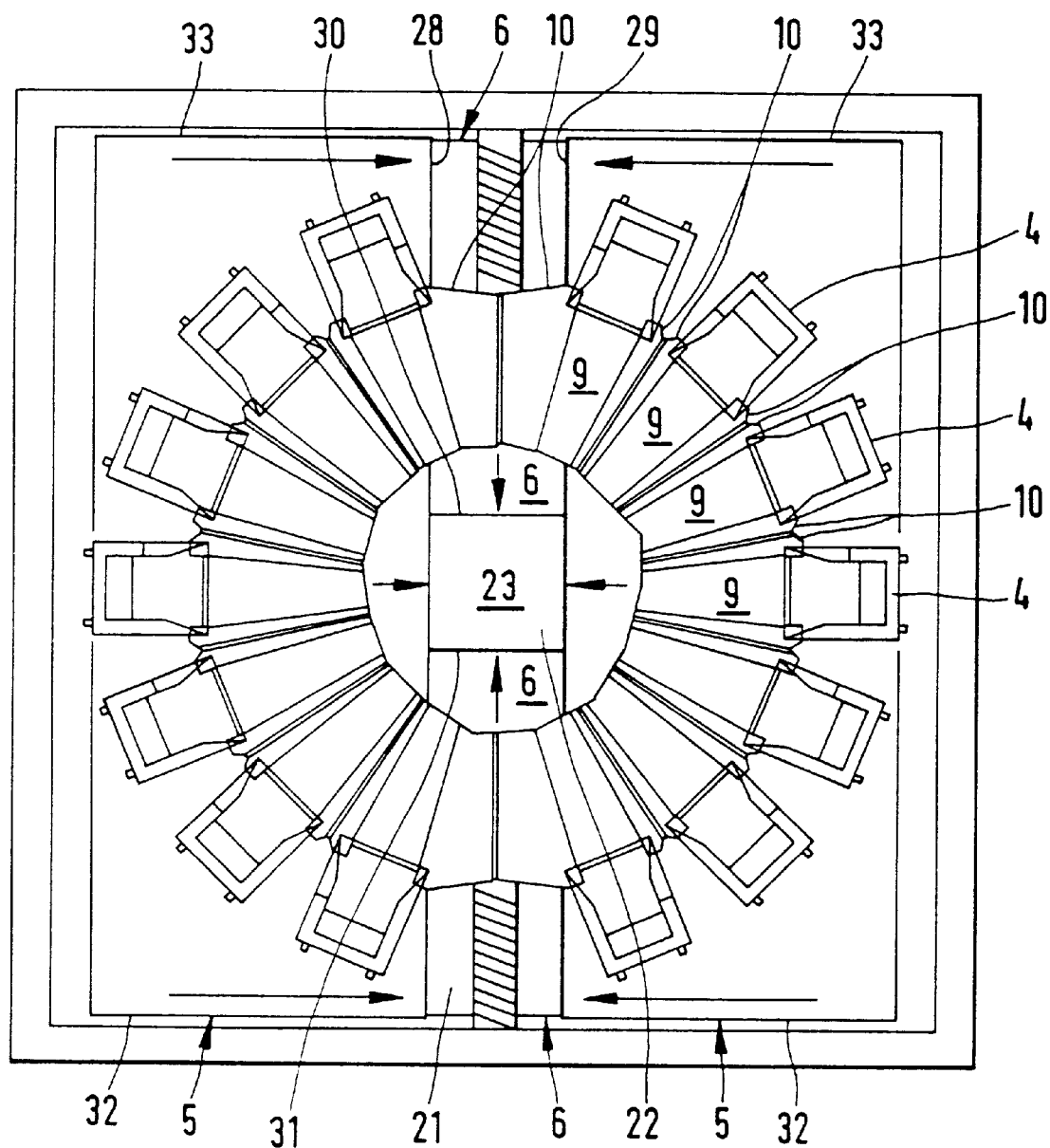
FIG. 2 is a top view of the combinatorial weighing apparatus shown in FIG. 1 with omitted distributing device.

As shown in FIGS. 1 and 2 the combinatorial weighing apparatus comprises a distributing device 1, fourteen vibrating channels 2 and fourteen vibrating motors 3, fourteen weighing receptacles 4, two first belt conveyors 5, two second belt conveyors 6 and a discharge opening 7.

Seven weighing receptacles 4 are arranged on a respective one of two halves of a circle. The conical distributing device 1 having an axis of symmetry 24 is disposed above the weighing receptacles 4 in such a manner that the axis of symmetry 24 perpendicularly intersects the plane defined by the circle in the center of the circle. An upper side 8 of the distributing device 1 facing away from the weighing receptacles 4 slopes radially downwards from the axis of symmetry 24 to the weighing receptacles 4. Furthermore, the fourteen vibrating channels 2 are arranged in a circular pattern, the inner end being located below the distributing device 1 and the outer end opening into a respective one of the weighing receptacles 4.

Figure 3:
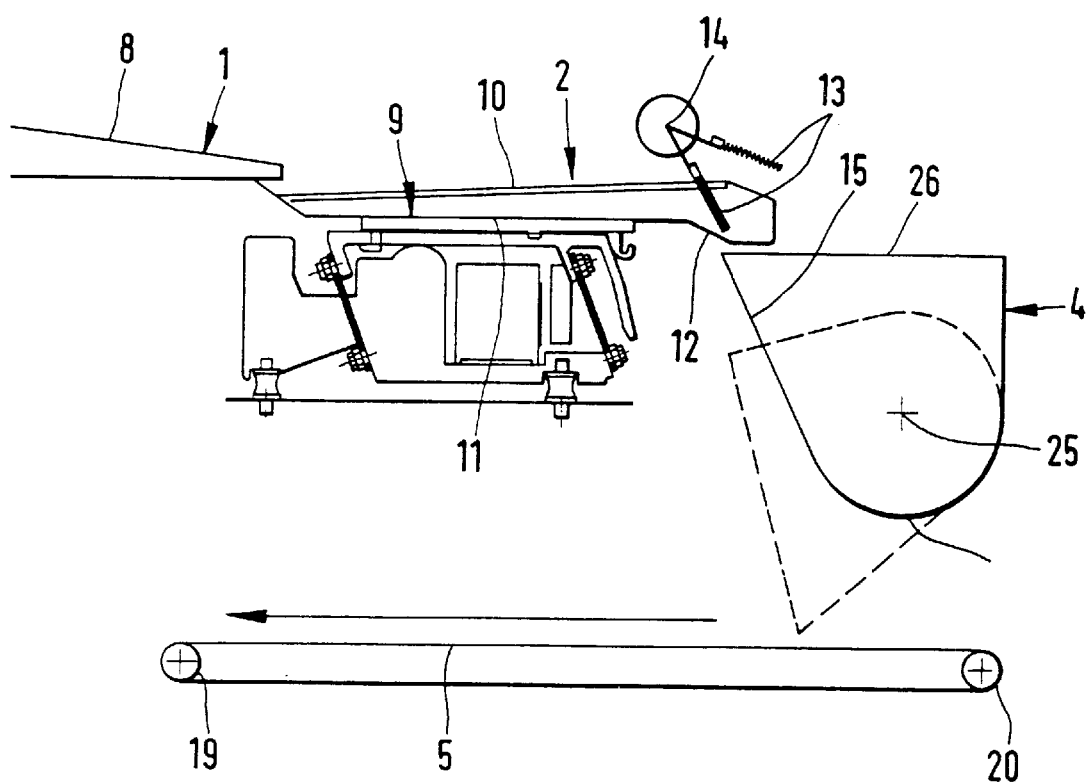
FIG. 3 shows a cross-section of a part of a second embodiment of the combinatorial weighing apparatus.
Figure 4:
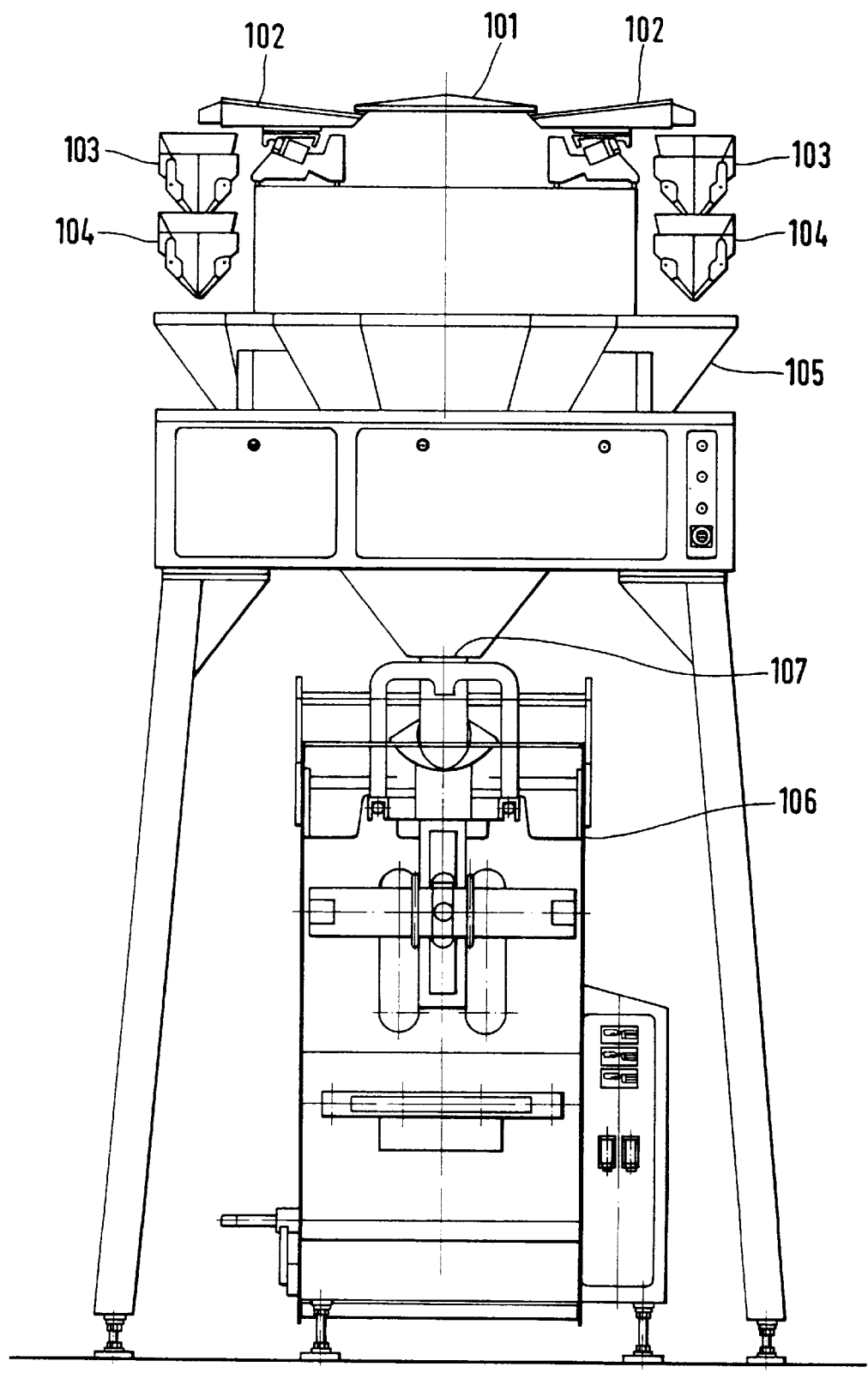
FIG. 4 is a schematic representation of a conventional combinatorial weighing apparatus.

Each vibrating channel 2 is coupled to a vibrating motor 3 and comprises a base 9 and two sidewalls 10 laterally delimiting the base 9. The sidewalls 10 are inclined towards the corresponding adjacent vibrating channel 2. One of the sidewalls 10 of each vibrating channel 2 is slightly higher than the other and folded over downwardly at its upper edge to such an extent that it overlaps the adjacent sidewall 10 of the next vibrating channel 2. Hence, product can not fall between the vibrating channels 2. The sidewalls 10 project to some extent beyond the end of the base 9 opening into the weighing receptacle 4. As best shown in FIG. 3 the base 9 has a first base portion 11 and an adjacent second base portion 12. The first base portion 11 is aligned substantially parallel to the plane of the circle and the second base portion 12 slopes downwardly from the first base portion 11 towards the weighing receptacle 4 and ends above the weighing receptacle 4. An inner wall 15 of the weighing receptacle 4 adjacent to the second base portion has the same slope as the second base portion 12. As shown in FIG. 1 the weighing receptacle 4 has a receptacle bottom 16 with a bottom aperture 17. The bottom aperture 17 can be closed by two bottom flaps 18.

Moreover, a stop flap 13 is provided for each vibrating channel 2 at the outer end thereof. Each stop flap 13 is hingedly connected with a frame of the combinatorial weighing apparatus around a first axis 14 which extends substantially parallel to the plane of the circle. As shown in FIG. 3 the stop flap 13 can be swung into a first position (shown in full lines). In this first position the transport path for the products to be transported is safely interrupted. The stop flap 13 can be swung from this first position into a second position (shown in dotted lines), clearing the transport path.

A respective first belt conveyor 5 is arranged substantially parallel to the plane of the circle below the weighing receptacles 4 for seven weighing receptacles 4 of each half-circle. The conveying direction of the two belt conveyors 5 is mutually opposite so that each conveyor transports the products in direction towards the respective other conveyor 5. The two belt conveyors 5 are formed as an endless band each having two lateral edges 32, 33, a first discharge end 28, 29, a first driven deflection roller 19 and a second deflection roller 20 parallel thereto. Each first deflection roller 19 is driven by a corresponding, not shown motor. In the region below the center of the circle the opposed and parallel first deflection rollers 19 and thus the first discharge ends 28, 29 are spaced from each other by a first distance.

The first distance is selected to be larger than the maximum size of the products to be processed. Thus, the belt conveyors 5 are spaced from each other by a first gap 21. The width of the belt conveyors 5 perpendicular to their transporting directions and the length of the belt conveyors 5 in transporting direction is sized so that the belt conveyors 5 receive all products discharged from the corresponding seven weighing receptacles. Two second belt conveyors 6 working in opposite directions are disposed below the first belt conveyors 5 substantially parallel to the plane of the circle. The conveying direction of the second belt conveyors 6 is substantially perpendicular to that of the first belt conveyors 5. Each second belt conveyor 6 is formed as an endless band with a third driven deflection roller and a parallel fourth deflection roller. The third deflection rollers are driven by a motor. The deflection rollers of the second belt conveyors 6 extend substantially perpendicular to the axes of the deflection rollers 19, 20 of the first belt conveyors 5. The two opposite third deflection rollers of the second belt conveyors 6 are parallel to each other. Two second discharge ends 30, 31 of the second belt conveyors 6 are spaced from each other by a distance which is larger than the maximum size of the products to be processed. Thus, the second belt conveyors 6 are spaced from each other by a second gap 22. The width of the second belt conveyors 6 perpendicular to their conveying direction is larger than the first gap. The second belt conveyors 6 each extend from one of the lateral edges 32, 33 of the first belt conveyors 5 to the discharge opening and are arranged below the first belt conveyors 5 in such a manner that a rectangular aperture 23 with side lengths defined by the first and second gap is formed in the region below the center of the circle. The discharge opening 7 is disposed below the aperture 23.

Moreover, a not shown control is provided which controls the vibrating motors 3, the weighing receptacles 4, the belt conveyors 5, 6 and the stop flap 13.

In a second embodiment the weighing receptacle 4 is modified. As shown in FIG. 3 the weighing receptacle 4 has a bottom area 27 with a circular segment-shaped cross-section, sidewalls adjacent thereto and a receptacle mouth 26. The weighing receptacle 4 is mounted to swivel about a second swivel axis 25 which extends substantially parallel to the plane of the circle. The inner wall 15 of the weighing receptacle 4 adjacent to the second base portion 12 of the vibrating channel 2 in receiving position of the weighing receptacle 4 is inclined towards the vibrating channel by a predefined angle with respect to an axis perpendicular to the circle plane. The angle is in a range between 20° and 60°. Preferably the angle corresponds to the slope of the second base portion 12. The sidewall 15 and the bottom 27 form a discharge chute in a discharge position of the weighing receptacle 4. The weighing receptacle 4 can be tipped from the receiving position (shown in full lines in FIG. 3) whereby the receptacle mouth is turned upwards towards the vibrating channel 2 into the discharge position (shown in dotted lines in FIG. 3) whereby the receptacle mouth 26 is directed towards the first belt conveyor 5. In the discharge position the upper edge of the inner wall 15 is slightly above the first belt conveyor 5 and the inner wall 15 slopes downwardly towards the first belt conveyor 5 so that the inner wall 15 and the bottom 27 serve as the discharge chute and the products within the weighing receptacles 4 can gently slide onto the first belt conveyor 5.

According to a further embodiment the belt conveyors 5, 6 slope downwardly from the weighing receptacles 4 towards the discharge opening 7.

In operation the lumpy product is fed to the distributing device 1 continuously or in larger batches. The products are then transported in timed transport intervals radially outwardly from the distributing device 1 through the vibrating channels 2 into the weighing receptacles 4. The products gently slide along the second base portion 12 of the vibrating channel 2 and the inner wall 15 of the weighing receptacle 4 into the same. The supply by the vibrating channels 2 is then stopped and the stop flaps 13 are pivoted into the first position to interrupt the transport path and to prevent further products from sliding into the weighing receptacles 4. The weighing receptacles 4 then weigh the partial portions of the products contained therein. The control selects the desired partial portions and opens the corresponding bottom flaps 18. In the second embodiment the corresponding weighing receptacles 4 are tipped around their second rotational axis 25 from the receiving position towards the center of the circle into the discharge position so that the products slide out of the weighing receptacles 4. Thereafter the bottom flaps 18 are closed again or the weighing receptacles 4 are tipped back into the receiving position, resp. The products discharged onto the first belt conveyors 5 are then transported to the first discharge ends 28, 29 and at the discharge ends 28, 29 discharged to the discharge opening 7 or transferred to the second belt conveyors 6, dependent on the position of the products measured in a direction perpendicular to the transport direction of the first belt conveyors 5. The second belt conveyors 6 now take over to transport the received products to the second discharge ends 30, 31 and discharge the products to the discharge opening 7. In this manner the products dumped from the weighing receptacles 4 are combined to a total portion at the discharge opening 7. Thereafter the associated stop flaps 13 of the empty weighing receptacles 4 are again opened and the entire process is repeated.

I claim:

1. Combinatorial weighing apparatus comprising:
    distributing means for distributing products to be weighed,
    a number of weighing receptacles arranged in a plane around said distributing means,
    a number of feeding means each feeding said products from said distributing means to one of said weighing receptacles,
    a central discharge opening below said plane for discharging said products, and
    conveying means comprising a conveyor member arranged below said weighing receptacles for receiving products dropping from said receptacles and drive means for driving said conveyor member to convey said products to said discharge opening.

2. The combinatorial weighing apparatus of claim 1, wherein said conveyor member comprises two counteracting first belt conveyors, each of said first belt conveyors being arranged below a fraction of said weighing receptacles and extending from one of said weighing receptacles which is furthest away from said central discharge opening in conveying direction towards said central discharge opening.

3. The combinatorial weighing apparatus of claims 2, wherein each of said first belt conveyors slopes downwardly from said weighing receptacles towards said central discharge opening.

4. The combinatorial weighing apparatus of claim 2, wherein and said first belt conveyors each have a discharge end, the discharge ends of the two first belt conveyors being spaced from each other, and
    further comprising a second conveyor means that is arranged below said discharge ends and extending along said discharge ends to said central discharge opening.

5. The combinatorial weighing apparatus of claim 4, wherein said second conveyor means comprises two second belt conveyors each extending from a side of said discharge ends furthest apart from said central discharge opening to said central discharge opening.

6. The combinatorial weighing apparatus of claim 5, wherein each of said second belt conveyors slopes downwardly from said weighing receptacles to said central discharge opening.

7. The combinatorial weighing apparatus of claim 4, wherein said first belt conveyors have a first conveying direction and said second belt conveyors have a second conveying direction, said first conveying direction including an angle of about 90° with said second conveying direction.

8. The combinatorial weighing apparatus of claim 1, wherein said number of feeding means comprise a number of vibrating channels and means for oscillating said vibrating channels, each vibrating channel having a discharge end disposed above a corresponding one of said weighing receptacles and a base having a first base portion and a following second base portion, the first base portion being substantially parallel to a plane of said weighing receptacles and said second base portion extending to said discharge end and sloping downwardly towards a corresponding one of said weighing receptacles, and wherein each weighing receptacle has an inner wall, which is adjacent to said second base portion and has an inclination, which substantially corresponds to a slope of said second base portion.

9. The combinatorial weighing apparatus of claim 1, further comprising a stop flap, which is hingedly mounted at said discharge end of a feeding means for interrupting the supply of said products to said weighing receptacle corresponding to said feeding means, and drive means for actuating said stop flap.

10. The combinatorial weighing apparatus of claim 1, wherein each weighing receptacle comprises a closable bottom flap.

11. The combinatorial weighing apparatus of claim 8, further comprising tipping means for tipping each weighing receptacle around a tipping axis extending substantially parallel to said plane of said weighing receptacles from a receiving position for receiving said products from said feeding means into a discharge position for discharging said products onto said conveying means, said inclined inner wall sloping towards said conveying means and serving as discharge chute in said discharge position of said weighing receptacles.

12. The combinatorial weighing apparatus of claim 6, wherein said slope of said belt conveyors is up to about 20°.

13. The combinatorial weighing apparatus of claim 6, wherein said slope of said belt conveyors is up to about 15°.

* * * * *